(12) United States Patent
Green

(10) Patent No.: US 11,282,690 B2
(45) Date of Patent: Mar. 22, 2022

(54) ION GUIDE EXIT TRANSMISSION CONTROL

(71) Applicant: MICROMASS UK LIMITED, Wilmslow (GB)

(72) Inventor: Martin Raymond Green, Bowdon (GB)

(73) Assignee: MICROMASS UK LIMITED, Wilmslow (GB)

( * ) Notice: Subject to any disclaimer, the term of this patent is extended or adjusted under 35 U.S.C. 154(b) by 124 days.

(21) Appl. No.: 16/472,516

(22) PCT Filed: Dec. 18, 2017

(86) PCT No.: PCT/GB2017/053783
§ 371 (c)(1),
(2) Date: Jun. 21, 2019

(87) PCT Pub. No.: WO2018/115828
PCT Pub. Date: Jun. 28, 2018

(65) Prior Publication Data
US 2021/0134576 A1    May 6, 2021

(30) Foreign Application Priority Data
Dec. 22, 2016 (GB) .................................... 1621966

(51) Int. Cl.
*H01J 49/00* (2006.01)
*H01J 49/06* (2006.01)
*G01N 27/622* (2021.01)

(52) U.S. Cl.
CPC .......... *H01J 49/065* (2013.01); *G01N 27/622* (2013.01); *H01J 49/061* (2013.01)

(58) Field of Classification Search
CPC ........ H01J 49/065; H01J 49/00; H01J 49/061; G01N 27/622
USPC .................................................. 250/281, 282
See application file for complete search history.

(56) References Cited

U.S. PATENT DOCUMENTS

| | | | |
|---|---|---|---|
| 6,730,904 B1 | 5/2004 | Wells | |
| 7,038,197 B2 | 5/2006 | Bateman et al. | |
| 8,445,845 B2 | 5/2013 | Green et al. | |
| 8,653,446 B1 | 2/2014 | Mordehai et al. | |

(Continued)

FOREIGN PATENT DOCUMENTS

| | | |
|---|---|---|
| CN | 101288146 A | 10/2008 |
| GB | 2552878 A | 2/2018 |

(Continued)

OTHER PUBLICATIONS

Search Report for United Kingdom Application No. GB1621966.9, dated May 17, 2017, 4 pages.

(Continued)

*Primary Examiner* — Jason L McCormack
(74) *Attorney, Agent, or Firm* — Kacvinsky Daisak Bluni PLLC

(57) ABSTRACT

An ion guide (40) is disclosed that comprises an ion confinement region having a first cross-sectional profile with a first cross-sectional area A1 in a plane orthogonal to a direction of ion transmission. An attenuation device ejects or deflects ions having spatial positions which fall outside of a second cross-sectional profile having a second cross-sectional area A2, wherein A2<A1.

17 Claims, 3 Drawing Sheets

(56) References Cited

U.S. PATENT DOCUMENTS

| | | | |
|---|---|---|---|
| 8,946,626 B2 | 2/2015 | Giles et al. | |
| 9,111,654 B2 | 8/2015 | Giles et al. | |
| 9,129,781 B2 | 9/2015 | Richardson | |
| 9,343,285 B2 | 5/2016 | Green et al. | |
| 2008/0210860 A1* | 9/2008 | Kovtoun | H01J 49/004 |
| | | | 250/283 |
| 2009/0189065 A1* | 7/2009 | Hashimoto | H01J 49/427 |
| | | | 250/282 |
| 2014/0048702 A1* | 2/2014 | Green | H01J 49/0031 |
| | | | 250/282 |
| 2014/0054456 A1* | 2/2014 | Kinugawa | G01N 27/62 |
| | | | 250/287 |

FOREIGN PATENT DOCUMENTS

| | | |
|---|---|---|
| JP | H10125246 A | 5/1998 |
| WO | 2007133469 A2 | 11/2007 |
| WO | 2009007739 A2 | 1/2009 |
| WO | 2012120297 A1 | 9/2012 |
| WO | 2015004457 A1 | 1/2015 |
| WO | 2015004459 A1 | 1/2015 |
| WO | 2015019460 A1 | 2/2015 |
| WO | 2016034125 A1 | 3/2016 |
| WO | 2016181167 A1 | 11/2016 |

OTHER PUBLICATIONS

International Search Report and Written Opinion for International Application PCT/GB2017/053783, dated Mar. 7, 2018, 27 pages.
Examination Report under Section 18(3), for Application No. GB1621966.9, dated Jul. 9, 2021, 4 pages.

\* cited by examiner

ION GUIDE EXIT TRANSMISSION CONTROL

CROSS-REFERENCE TO RELATED APPLICATIONS

This application is a national phase filing claiming the benefit of and priority to International Patent Application No. PCT/GB2017/053783, filed on Dec. 18, 2017, which claims priority from and the benefit of United Kingdom patent application No. 1621966.9 filed on Dec. 22, 2016. The entire contents of these applications are incorporated herein by reference.

FIELD OF THE INVENTION

The present invention relates generally to analysis instruments and in particular to analysis instruments such as mass spectrometers or ion mobility spectrometers, as well as methods of analysis using the same.

BACKGROUND

Conventional orthogonal acceleration Time of Flight mass spectrometers are able to operate at ion arrival rates of greater than 1500 ions per mass spectral species peak per time of flight transient (i.e. push or orthogonal acceleration event) when operating in a continuous incoming beam mode of operation.

It is known to combine ion mobility spectrometry ("IMS") with time of flight mass spectrometry in order to produce nested ion mobility-mass to charge ratio data sets. When acquiring such nested data sets, ions of a given species are no longer delivered as a continuous stream of ions over a given time period to a Time of Flight mass analyser. Instead, ions are concentrated into narrow ion mobility peaks. For example, a typical ion mobility separation may take approx. 20 ms but an individual ion mobility separation peak may have a FWHM width of only 0.3 ms. Accordingly, it will be apparent that if the same average ion current per unit time is maintained, then the ion arrival rate may increase by a factor of e.g. x60 so that, for example, there may be approx. 90,000 ions per push (ipp) in such an ion mobility separation mode of operation.

It will be understood by those skilled in the art that as of the priority date of the present application (2016) it is problematic to design commercial analogue to digital recording systems (ADCs) which are capable of quantitatively recording single ion arrivals at ion arrival rates approaching 90,000 ipp for individual mass to charge ratio species.

It will also be understood by those skilled in the art that such very high ion arrival rates may exceed the linear dynamic range of currently utilised commercial electron multipliers as typically utilised in a Time of Flight mass spectrometer.

It is known to attempt to extend the dynamic range of an orthogonal acceleration Time of Flight mass spectrometer by controlling the transmission of ions within various stages of a mass spectrometer. For example, U.S. Pat. No. 8,445,845 (Micromass) discloses a method of attenuating an ion beam upstream of an ion trap thereby allowing the population of ions to be varied within the ion trap during a fixed fill time. When this method is applied in conjunction with a downstream ion mobility separator, the population of ions accumulated in an upstream trapping region (and subsequently released into the ion mobility separation device) may be controlled.

However, a disadvantage of controlling the total population of ions entering an ion mobility separation device is that the population of all mass to charge ratio species must be reduced in order to ensure that the species with the largest population of ions does not result in detector or ADC saturation. This reduces the overall dynamic range of the mass spectral data produced. In targeted analysis the population of ions in the ion trap may be set to control the downstream saturation characteristics for a target mass to charge ratio. This may only be the case if a downstream mass filter, such as a resolving quadrupole, is provided to ensure that a very large population of a non-targeted species, trapped with the target ions, does not result in distortion of the detection system.

U.S. Pat. No. 8,653,446 (Mordehai) discloses another method of increasing the dynamic range of an ion mobility spectrometer. The method involves accumulating a first sample of ions over a first time interval and providing the first sample of ions to an ion detector to provide a first frame. The method further comprises accumulating a second sample of ions over a second time interval (which is different to the first time interval) and providing the second sample of ions to the ion detector to provide a second frame. First data points of the first frame are selectively combined with second data points of the second frame to provide an accumulation frame of the first and second samples of ions.

WO 2015/004457 (Micromass) discloses a method of mass spectrometry comprising transmitting ions and obtaining first mass spectral data and automatically determining during an acquisition whether the first mass spectral data suffers from saturation or is approaching saturation. If a determination is made during an acquisition that the first mass spectral data suffers from saturation or is approaching saturation then the method further comprises automatically changing or altering the intensity of ions which are detected by an ion detector and obtaining second mass spectral data. The method further comprises substituting one or more portions of the first mass spectral data with one or more corresponding portions of the second mass spectral data multiplied or scaled by an attenuation or scale factor and/or by an integer or other value so as to form a composite mass spectrum, wherein the composite mass spectrum comprises one or more ion peaks from the first mass spectral data and one or more ion peaks from the second mass spectral data.

U.S. Pat. No. 9,129,781 (Micromass) discloses a method of attenuating an ion beam downstream of an ion mobility separation device. Attenuation may be achieved by synchronising the release of ions from an upstream ion guide with an orthogonal acceleration pulse to adjust the duty cycle of a mass spectrometer. This has the advantage that it is fast enough to allow selective attenuation of different populations of ions as they elute or emerge from the ion mobility separator. However, only a restricted mass to charge ratio range can be transmitted into the orthogonal acceleration Time of Flight mass analyser. In addition, ions in a low duty cycle mode of operation only reside in a small portion of the axial length of the orthogonal acceleration region compared to ions in a high transmission mode which illuminate all or most of this region. As a result, this can produce mass to charge ratio shifts for different attenuation values.

It is also known to use a defocusing lens such as described in U.S. Pat. No. 7,038,197 (Micromass) in order to attenuate an ion beam in a selective manner. However, although using a defocusing lens is a rapid attenuation method, such an approach can also result in undesirable mass to charge ratio and/or charge state discrimination effects which may require a complex calibration routine in order to compensate for.

It is desired to provide an improved method of attenuating an ion beam in the context of coupling ion mobility spectrometry with mass spectrometry. In particular, it is desired to provide an improved method of attenuating an ion beam which does not suffer from mass to charge ratio and/or charge state discrimination effects.

SUMMARY

According to an aspect there is provided an ion guide comprising:

an ion confinement region having a first cross-sectional profile with a first cross-sectional area $A_1$ in a plane orthogonal to a direction of ion transmission; and an attenuation device arranged and adapted to eject or deflect ions having spatial positions which fall outside of a second cross-sectional profile having a second (different) cross-sectional area $A_2$.

According to various embodiments the second cross-sectional profile and/or the second cross-sectional area $A_2$ may be smaller than the first cross-sectional profile and/or the first cross-sectional area $A_1$ (i.e. according to various embodiments $A_2 < A_1$).

Various embodiments are disclosed which relate to attenuating an ion beam substantially without mass to charge ratio and/or charge state dependency effects. Other embodiments are disclosed which relate to attenuating an ion beam with substantially less severe dependency effects than is inherent with conventional ion beam attenuation techniques.

It will be apparent, therefore, that a particularly beneficial aspect of the various embodiments is that any calibration of the attenuation factor which may be required can be significantly simplified (or potentially rendered redundant) since the method of attenuation of the ion beam according to various embodiments does not introduce any significant mass to charge ratio and/or charge state dependency effects.

Various embodiments are disclosed which provide a means or method of attenuating or reducing the number density of a population of ions travelling from an ion source to, for example, a downstream device substantially without mass to charge, charge or mobility dependence or distortion.

The various embodiments allow different populations of ions eluting or emerging from an ion mobility spectrometer or a mass separator to be attenuated differently based upon their elution or emergence times.

The ion guide may be arranged and adapted to onwardly transmit ions having spatial positions which fall inside the second (smaller) cross-sectional profile. According to various embodiments ions which have spatial positions which fall outside the second cross-sectional profile may be attenuated or otherwise lost to the system whereas ions which have spatial positions which fall inside or within the second cross-sectional profile may be substantially unaffected by the operation of the attenuation device and hence such ions may be allowed to proceed onwardly to a region of the ion guide downstream of the attenuation device.

According to various embodiments a population of ions within the ion confinement region may be arranged either: (i) so as to be distributed substantially homogenously in one or more direction(s) which is/are substantially orthogonal to the direction of ion transmission; or (ii) so as to be distributed substantially homogenously within the second cross-sectional profile at least in a direction (e.g. x-direction) which is substantially orthogonal to the direction of ion transmission (e.g. z-direction). It is contemplated that according to certain embodiments the ions may not be totally homogeneously distributed in the other direction (e.g. y-direction) which is also substantially orthogonal to the direction of ion transmission (e.g. z-direction).

The ion guide may comprise a plurality of first electrodes. The ion guide may further comprise a device arranged and adapted to apply AC or RF voltages to the plurality of first electrodes so as to generate a pseudo-potential well which acts to confine ions in a first radial direction (e.g. y-direction) within the ion guide. The ion guide may further comprise one or more second electrodes and the ion guide may further comprise a device arranged and adapted to apply one or more DC voltages to the one or more second electrodes in order to confine ions in a second radial direction (e.g. x-direction) within the ion guide. According to various embodiments ions may be confined in a first radial direction (i.e. y-direction) by a pseudo-potential well but may be confined in an orthogonal second radial direction (i.e. x-direction) by a static DC potential well.

Other embodiments are contemplated wherein a RF voltage may be applied to the one or more second electrodes in order to confine ions in a second radial direction within the ion guide.

The ion guide may further comprise a control device arranged and adapted to apply one or more voltages to the attenuation device in order to cause a portion of ions within the ion confinement region either: (i) to be ejected from the ion confinement region; (ii) to be deflected off an ion-optical axis within the ion confinement region; or (iii) to emerge from the ion confinement region and then either be ejected and/or be deflected off an ion-optical axis. It is contemplated, for example, that the attenuation device may comprise one or more electrodes (e.g. one or more planar or ring electrodes) located e.g. within an intermediate section of the ion guide. The control device may apply one or more DC and/or RF voltages to the attenuation device in order to cause undesired ions to be ejected and/or deflected from the ion guide. In particular, the ion guide may comprise a reduced radial confinement section wherein in a mode of operation ions passing through the reduced radial confinement section experience substantially no or a reduced degree of radial confinement relative to sections of the ion guide upstream and/or downstream of the reduced radial confinement section (in which or where it is desired to confine ions radially). Furthermore, according to various embodiments the attenuation device may be located either: (i) within or adjacent the reduced radial confinement section so that when the attenuation device is activated in order to eject or deflect a portion of ions from the ion confinement region, the ions may be substantially ejected or deflected from the ion guide; or (ii) the attenuation device may be located downstream of the ion guide in order to eject and/or deflect ions. Accordingly, the portion of the ion guide adjacent the attenuation device (or the one or more electrodes comprising the attenuation device) may allow ions to pass radially therethrough without the ions being radially confined either by a radial pseudo-potential well or by a radial static DC potential well.

The attenuation device may comprise a plurality of attenuation electrodes wherein the control device is arranged and adapted to apply one or more voltages to different attenuation electrodes as desired in order to vary, control, increase or decrease an ion attenuation factor. It will be appreciated that a particularly beneficial aspect according to various embodiments is the ability to variably control the attenuation factor of the attenuation device. For example, an ion beam may be attenuated by the attenuation device so that the intensity of the ion beam after having passed through the attenuation device is <5%, 5-10%, 10-15%, 15-20%, 20-25%, 25-30%, 30-35%, 35-40%, 40-45%, 45-50%, 50-55%, 55-60%, 60-65%, 65-70%, 70-75%, 75-80%, 80-85%, 85-90%, 90-95% or >95% of the intensity of the ion beam immediately prior to ions being ejected from the ion guide by the attenuation device.

The attenuation device may be operated so as to vary the intensity of an ion beam in a continuous, smooth, regular, linear or time dependent manner. Alternatively, the attenuation device may be operated so as to vary the intensity of the ion beam in a discontinuous, stepped, irregular, non-linear or non-time dependent manner. Embodiments are contemplated, for example, wherein the attenuation device may be repeatedly switched back and forth between operating at two or more set or otherwise fixed attenuation factors. For example, according to an embodiment the attenuation device may be repeatedly switched back and forth between a relatively high transmission mode of operation wherein the attenuation device may effectively be switched OFF and a relatively low transmission mode of operation wherein the attenuation device may effectively be switched ON so as to attenuate an ion beam passing therethrough.

The control device may be arranged and adapted to vary, control, increase or decrease the ion attenuation factor as a function of time, retention time, elution time or emergence time, in a time dependent manner or in a predetermined or data dependent manner.

According to various embodiments the control device may be arranged and adapted to vary, control, increase or decrease the ion attenuation factor during the course of one or more ion mobility separation cycles. The control device may be arranged so as to selectively attenuate individual ion mobility peaks or groups of ions having substantially similar ion mobilities which emerge or elute at substantially the same time. Each ion mobility separation cycle may, for example, take <5 ms, 5-10 ms, 10-15 ms, 15-20 ms, 20-25 ms, 25-30 ms or >30 ms.

Other embodiments are also contemplated wherein the control device may be arranged and adapted to vary, control, increase or decrease the ion attenuation factor as a function of ion intensity, charge state, mass, mass to charge ratio, ion mobility, differential ion mobility or another physico-chemical property.

The ion guide may further comprise a device (or an ion mobility section) which is arranged and adapted to cause ions to separate according to their ion mobility, differential ion mobility, collision cross section ("CCS") or interaction cross section within the ion guide. The device or ion mobility section may, for example, be arranged upstream and/or downstream of the attenuation device.

According to another aspect there is provided a mass spectrometer comprising an ion guide as described above.

The mass spectrometer may further comprise an ion mobility separation ("IMS") device, a differential ion mobility separation device or a Field Asymmetric Ion Mobility Spectrometer ("FAIMS") separation device arranged upstream and/or downstream of the ion guide.

According to another aspect there is provided a method of guiding ions comprising:

confining ions within an ion confinement region having a first cross-sectional profile with a first cross-sectional area $A_1$ in a plane orthogonal to a direction of ion transmission; and ejecting or deflecting ions having spatial positions which fall outside of a second cross-sectional profile having a second (different) cross-sectional area $A_2$.

According to various embodiments the second cross-sectional profile and/or the second cross-sectional area $A_2$ may be smaller than the first cross-sectional profile and/or the first cross-sectional area $A_1$ (i.e. according to various embodiments $A_2 < A_1$).

According to various embodiments a population of ions within the ion confinement region may be arranged either: (i) so as to be distributed substantially homogenously in one or more direction(s) which is/are substantially orthogonal to the direction of ion transmission; or (ii) so as to be distributed substantially homogenously within the second cross-sectional profile at least in a direction which is substantially orthogonal to the direction of ion transmission.

According to another aspect there is provided a method of mass spectrometry comprising a method as described above.

Ions formed in an ion source may be introduced into an ion guide whereupon these ions may take up spatially distributed positions in a direction orthogonal to the direction of ion travel. The ions may be arranged substantially homogenously in a direction orthogonal to the direction of ion travel. At the exit of the ion guide, or at an intermediate region within the ion guide, a means or device may be provided which may be arranged to prevent ions having certain particular spatial distributions from continuing onwards in an axial direction i.e. such ions may be ejected or deflected (e.g. from the ion guide) or otherwise attenuated with the overall effect of reducing the transmission of the ion beam which is onwardly transmitted. The means or device for restricting the onward passage of ions may be adjusted to change the effective transmission of the ion guide in a predetermined or data dependent manner.

The variable restriction device may be arranged, for example, at the exit of an ion mobility separation device in order to attenuate ions emerging from an ion mobility separation device.

Controlling the transmission of ions through the instrument may be used to mitigate saturation effects of downstream analysers, trapping regions or detection electronics.

The various embodiments provide an improved method of attenuating an ion beam (e.g. exiting an ion mobility separation device) in order to increase the dynamic range of a downstream detection system or other downstream device.

According to an aspect there is provided a method of mass spectrometry comprising: (a) producing ions in an ion source; (b) transmitting ions through a RF confined ion guide containing buffer gas (e.g. air, nitrogen, helium, argon, carbon dioxide etc.) such that ions take up position within an extended cross sectional area A within the ion guide as they traverse the ion guide; (c) providing an apparatus or field arranged at the exit of the ion guide such that, in operation, only ions substantially within a cross section A' are transmitted onwards whilst ions within a cross sectional area A-A' are ejected from the ion guide, wherein A>A'.

The ion guide may comprise an ion mobility separation device.

The internal cross section of the ion guide may be extended in a dimension (e.g. x-direction) orthogonal to the direction of ion travel (e.g. z-direction).

The cross section of the ion beam may be larger at the exit of the ion guide than at the entrance or upstream end of the ion guide.

The transmission of ions exiting the ion guide may be repetitively changed from a high transmission to a lower transmission in order to provide a high and low transmission data set.

The transmission of ions exiting the ion guide may be altered in a data dependent manner.

The transmission of ions may be altered within an IMS cycle.

The spectrometer may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) a Surface Assisted Laser Desorption Ionisation ("SALDI") ion source.

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The ion-molecule reaction device may be configured to perform ozonolysis for the location of olefinic (double) bonds in lipids.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) > about 500 V peak to peak.

The AC or RF voltage may have a frequency selected from the group consisting of: (i) < about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) > about 10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) < about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) > about 1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

Optionally, in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

Optionally, in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

The process of Electron Transfer Dissociation fragmentation may comprise interacting analyte ions with reagent ions, wherein the reagent ions comprise dicyanobenzene, 4-nitrotoluene or azulene.

A chromatography detector may be provided, wherein the chromatography detector comprises either:

a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

The electrodes may comprise electrodes which are formed on a printed circuit board, printed wiring board or an etched wiring board. For example, according to various embodiments the electrodes may comprise a plurality of traces applied or laminated onto a non-conductive substrate. The electrodes may be provided as a plurality of copper or metallic electrodes arranged on a substrate. The electrodes may be screen printed, photoengraved, etched or milled onto a printed circuit board or equivalent. According to an embodiment the electrodes may comprise electrodes arranged on a paper substrate impregnated with phenolic resin or a plurality of electrodes arranged on a fibreglass mat impregnated within an epoxy resin. More generally, the electrodes may comprise one or more electrodes arranged on a non-conducting substrate, an insulating substrate or a plastic substrate. According to embodiments the plurality of electrodes may be arranged on a substrate.

A plurality of insulator layers may be interspersed or interleaved between an array of electrodes. The plurality of electrodes may be arranged on or deposited on one or more insulator layers.

BRIEF DESCRIPTION OF THE DRAWINGS

Various embodiments will now be described, by way of example only, and with reference to the accompanying drawings in which.

DETAILED DESCRIPTION

Figure 1:
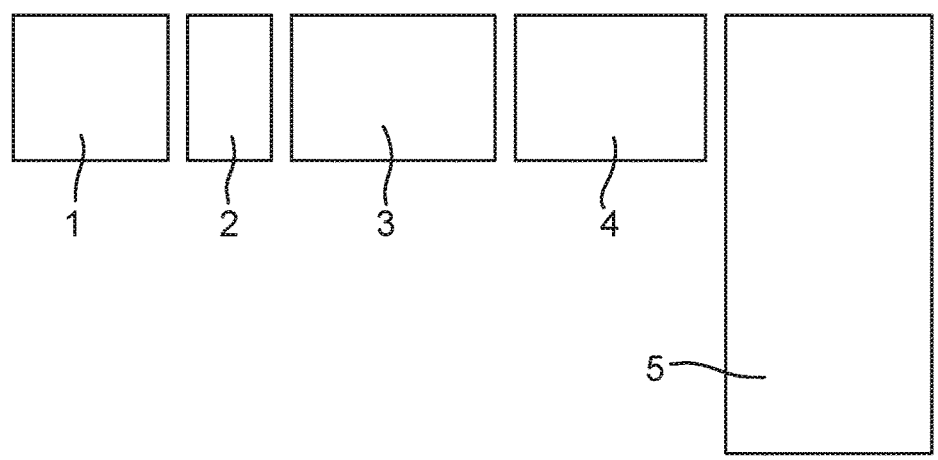
FIG. 1 shows a conventional mass spectrometer arrangement.

A conventional mass spectrometer will first be described with reference to FIG. 1. FIG. 1 shows a block diagram of a conventional mass spectrometer arrangement incorporating an ion mobility separation device. The mass spectrometer as shown in FIG. 1 comprise an ion source 1, an ion trap 2, an ion mobility separator 3, a mass filter and/or a collision or reaction cell 4 followed by an orthogonal acceleration Time of Flight mass spectrometer or mass analyser 5.

The known mass spectrometer may be operated in an ion mobility separation mode of operation wherein ions are produced in the ion source 1 and the ions are then trapped within an ion accumulation region or ion trap 2. Ions within the ion accumulation region or ion trapping region 2 may be periodically released from the accumulation region 2 into an ion mobility separation region or ion mobility separator 3 arranged downstream of the ion trapping region 2. Ions which are ejected from the ion trapping region 2 are caused to separate temporally according to their ion mobility as they pass through the ion mobility separator 3. The temporally separated ions may then be arranged to pass to a quadrupole mass filter and/or a collision or reaction cell 4 which is arranged downstream of the ion mobility separator 3. The mass filter may be arranged to mass filter the ions and the collision or reaction cell 4 may be arranged to fragment the ions or subject the ions to a reaction. Parent ions (or fragment ions) are then arranged to pass into the orthogonal acceleration Time of Flight mass spectrometer 5 wherein the ions are then mass analysed.

Figure 2:
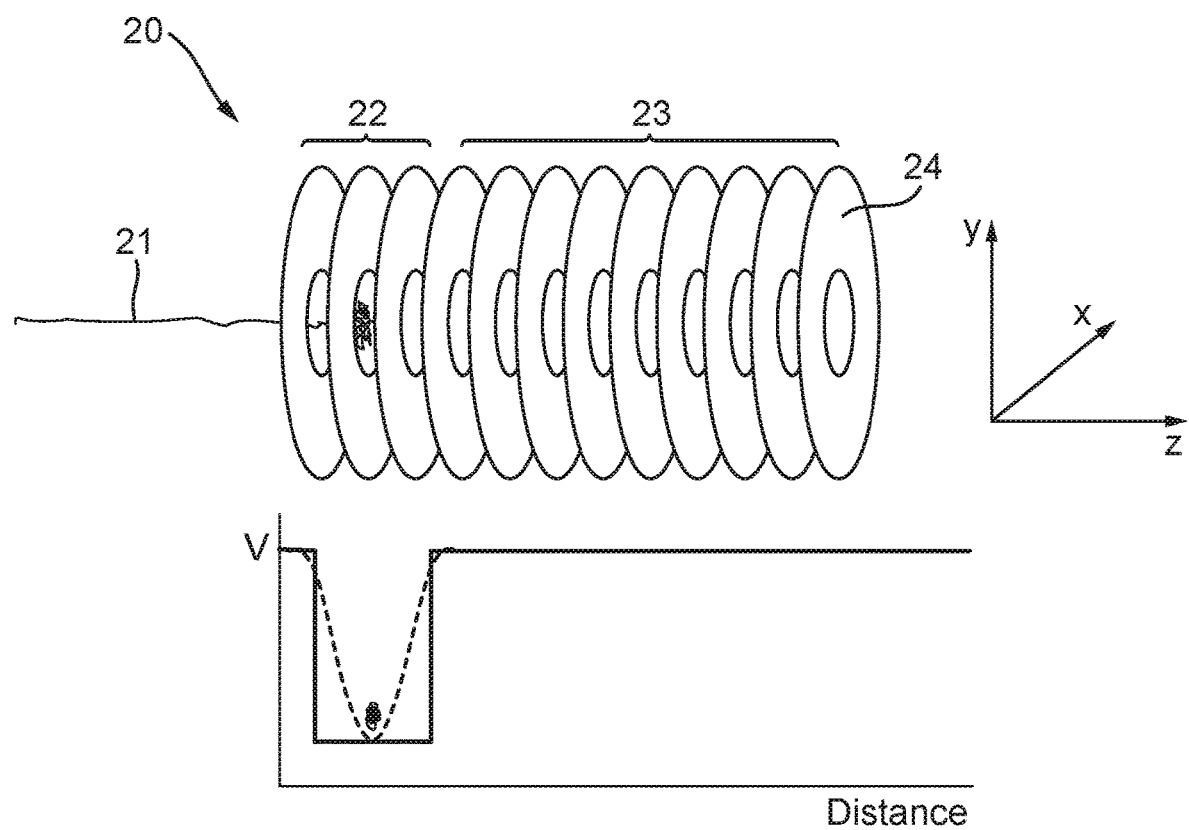
FIG. 2 shows a conventional ion guide having an upstream ion trapping section.

FIG. 2 shows a known ion guide arrangement 20 which may be used as an ion mobility separation device. The ion guide 20 comprises an initial or upstream ion trapping region 22 and a downstream ion mobility separation region 23. Ions may be initially retained or trapped axially within the upstream ion trapping region 22 before being released or otherwise pulsed into the downstream ion mobility separation region 23.

The ion guide 20 comprises a plurality of ring electrodes 24 which are arranged to form an ion tunnel arrangement. An ion guiding region is formed within the ion guide 20 wherein the ion guiding region has a circular cross section. Opposite phases of an RF voltage are applied to axially adjacent ring electrodes 24 with the result that a pseudo-potential is created which acts to confine ions radially within the ion guide 20. An ion beam 21 is shown which is incident along the central axis of the ion guide 20 and the ions are shown being confined in the axial (z-direction) within the upstream ion trapping region 22. Ions trapped within the upstream ion trapping region 22 assume a spread of positions in the x- and y-radial directions.

The ion guide 20 may be operated in an ion mobility separation mode of operation wherein the ion guide 20 may, for example, be maintained at a pressure of e.g. 0.5-10 mbar and an ion mobility separation buffer gas (e.g. air, nitrogen, helium, argon, carbon dioxide etc.) may be provided within the ion guide 20. Ions may be released from the upstream ion trapping region 22 and ejected into the downstream ion mobility separation region 23. One or more transient DC voltages may be applied to the ring electrodes 24 in the ion mobility separation region 23 in order to urge ions along and through the ion mobility separation region 23 so that ions separate temporally according to their ion mobility.

In the known arrangement shown in FIG. 2 the ion confining region comprises a cylindrical volume and the inscribed radius is 5-10 mm in diameter.

The particular arrangement shown in FIG. 2 has the advantage that any voltage applied to the ring electrodes 24 forming the ion guide 20 either to confine ions within the ion guide 20 and/or to drive or otherwise urge ions along the axial length of the device 20 (e.g. by applying one or more transient DC voltages to the ring electrodes 24) has the result of generating an electric field which effectively penetrates into the region of ion confinement on or along the central axis of the device. Accordingly, ions confined within the ion guiding region experience essentially the full impact of any electric field which results from the application of voltages to the ring electrodes 24.

However, the ion trap or ion trapping region 22 has a relatively limited space charge capacity. Furthermore, ions exiting the device 20 may take up radial positions which are dependent upon their mass to charge ratio and/or their charge state. This effect is generally undesirable and is known as stratification.

Stratification within the ion guide and in respect of ions emerging from the ion mobility section 23 is potentially problematic in certain situations.

It will also be appreciated that the attenuation method described in U.S. Pat. No. 7,038,197 (Micromass) can similarly result in potentially problematic mass to charge ratio and/or charge state dependent effects.

Stratification effects are potentially problematic since they can require the attenuation factor of an attenuation device to be calibrated with respect to the mass to charge ratio and/or charge state of ions. The calculation and utilisation of a mass to charge ratio and/or charge state dependent calibration in respect of the attenuation factor is potentially quite complex and generally undesirable.

Figure 3:
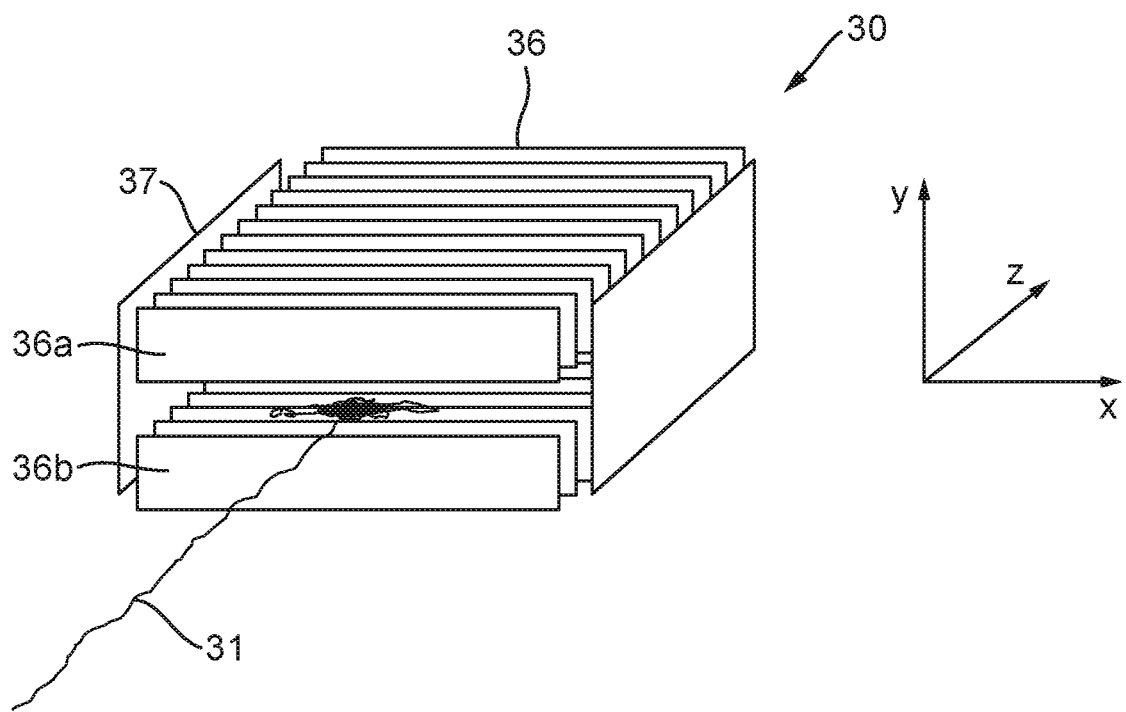
FIG. 3 shows an ion guide according to various embodiments.

FIG. 3 shows an ion guide or ion mobility device 30 having an extended ion trapping region according to various embodiments which seeks to enable an ion beam to be attenuated in a controlled manner without suffering from stratification effects. According to various embodiments an ion trapping arrangement is provided which comprises a plurality of first extended plate or planar electrodes 36a, 36b arranged so that a rectangular ion trapping region is formed between the first plate or planar electrodes 36a, 36b. The ion trapping region provided between the first plate or planar electrodes 36a, 36b has an extended length in the x-direction. The ion trapping region has a conventional or standard length or height in the y-direction. Accordingly, the ion trapping region is longer in the x-direction than in the y-direction and hence the ion guide may be considered to have an extended trapping region in the x-direction with an overall extended (i.e. rectangular) ion confinement region.

According to various embodiments the ion trapping region may have a height of approx. 5 mm in the y-direction as shown in FIG. 3 and a greater width of approx. 10-15 mm, 15-20 mm, 20-25 mm, 25-30 mm, 30-35 mm, 35-40 mm, 40-45 mm, 45-50 mm or >50 mm in the x-direction.

The first plate or planar electrodes 36a, 36b may comprise electrodes which are formed on a printed circuit board, printed wiring board or an etched wiring board. For example, according to various embodiments the electrodes may comprise a plurality of traces applied or laminated onto a non-conductive substrate. The electrodes may be provided as a plurality of copper or metallic electrodes arranged on a substrate. The electrodes may be screen printed, photoengraved, etched or milled onto a printed circuit board or equivalent. According to an embodiment the electrodes may comprise electrodes arranged on a paper substrate impregnated with phenolic resin or a plurality of electrodes arranged on a fibreglass mat impregnated within an epoxy resin. More generally, the electrodes may comprise one or more electrodes arranged on a non-conducting substrate, an insulating substrate or a plastic substrate. According to embodiments the plurality of electrodes may be arranged on a substrate.

A plurality of insulator layers may be interspersed or interleaved between an array of first plate or planar electrodes 36a, 36b. The plurality of first plate or planar electrodes 36a, 36b may be arranged on or deposited on one or more insulator layers.

As shown in FIG. 3, the ion guide or ion mobility device 30 may further comprise two (or more) second longitudinal plate or planar electrodes 37 which may be arranged along opposite sides of the ion guide or ion mobility device 30 in a plane parallel to the direction of ion travel through the ion guide or ion mobility device 30 (i.e. in the z-direction).

The first plate or planar electrodes 36 may comprise a plurality of first upper plate or planar electrodes 36a and a corresponding plurality of first lower plate or planar electrodes 36b. The upper plate or planar electrodes 36a and the corresponding lower plate or planar electrodes 36b may be provided in pairs of opposed electrodes i.e. in the same x-y plane. The upper plate or planar electrodes 36a and the corresponding lower plate or planar electrodes 36b may be arranged generally in a plane (i.e. in the x-y plane) which is orthogonal to a direction of travel of ions through the ion guide (i.e. the z-direction).

The two second longitudinal plate or planar electrodes 37 may be arranged generally in a plane (i.e. in the y-z plane) which is orthogonal to the first upper and lower plate or planar electrodes 36a, 36b which are arranged in the x-y plane.

The second longitudinal plate or planar electrodes 37 may comprise electrodes which are formed on a printed circuit board, printed wiring board or an etched wiring board. For example, according to various embodiments the electrodes may comprise a plurality of traces applied or laminated onto a non-conductive substrate. The electrodes may be provided as a plurality of copper or metallic electrodes arranged on a substrate. The electrodes may be screen printed, photoengraved, etched or milled onto a printed circuit board or equivalent. According to an embodiment the electrodes may comprise electrodes arranged on a paper substrate impregnated with phenolic resin or a plurality of electrodes arranged on a fibreglass mat impregnated within an epoxy resin. More generally, the electrodes may comprise one or more electrodes arranged on a non-conducting substrate, an insulating substrate or a plastic substrate. According to embodiments the plurality of electrodes may be arranged on a substrate.

The second longitudinal plate or planar electrodes 37 may be arranged on or deposited on one or more insulator layers.

An ion beam 31 is shown in FIG. 3 which is incident upon the ion guide or ion mobility device 30. As the ion beam 31 enters the ion guide or ion mobility device 30 the ions assume an extended range of positions in the x-direction as shown in FIG. 3.

Ions may be confined in a first radial direction (i.e. the y-direction) by applying alternating phases of a RF voltage to the pairs of extended plate or planar electrodes 36a, 36b i.e. to the plurality of upper plate or planar electrodes 36a and to the corresponding plurality of lower plate or planar electrodes 36b. In particular, opposite phases of an RF voltage may be applied to axially adjacent pairs of first plate or planar electrodes 36.

The ions may also be confined in a second radial direction (i.e. the x-direction) by the application of a DC voltage to the two second longitudinal plate or planar electrodes 37.

Accordingly, the ion guide or ion mobility separation device 30 may comprise a plurality of first electrodes. The ion guide or ion mobility separation device 30 may further comprise a device arranged and adapted to apply AC or RF voltages to the plurality of first electrodes 36 so as to generate a pseudo-potential well which acts to confine ions in a first radial direction (e.g. y-direction) within the ion guide or ion mobility separation device 30. The ion guide or ion mobility separation device 30 may further comprise one or more second electrodes 37 and the ion guide or ion mobility separation device 30 may further comprise a device arranged and adapted to apply one or more DC voltages to the one or more second electrodes 37 in order to confine ions in a second radial direction (e.g. x-direction) within the ion guide or ion mobility separation device 30. Therefore, according to various embodiments ions may be confined in a first radial direction (i.e. y-direction) by a pseudo-potential well and may be confined in an orthogonal second radial direction (i.e. x-direction) by a static DC potential well.

It will be apparent that the ion trapping arrangement as shown in FIG. 3 has an extended cross-sectional profile. In particular, the ion guide or ion mobility separation device 30 has an ion trapping region having a cross-sectional profile which allows ions to assume extended spatial profiles in the x-dimension. The ions may be distributed homogeneously in the x-direction. Furthermore, the arrangement has the beneficial effect that electric fields generated by the application of voltages to the upper and lower plate or planar electrodes 36a, 36b are able to penetrate fully into the region of ion confinement. Accordingly, ions within the ion confinement region essentially experience the full effects of any generated electric field resulting from the application of one or more voltages to the first planar or plate electrodes 36a, 36b and/or the second longitudinal planar or plate electrodes 37.

It will also be apparent that the ion guide or ion mobility separator 30 according to various embodiments as shown in FIG. 3 has a substantially higher space charge capacity compared with, for example, known ion tunnel ion guides as shown in FIG. 2.

Ions travelling through the ion guide or ion mobility separator 30 according to various embodiments as shown in FIG. 3 are free to take up extended positions in the x-direction. In the particular example shown in FIG. 3, a beam of ions 31 is shown incident upon the ion guide or ion mobility separator 30 wherein the incident beam of ions 31 has an initial relatively small distribution in the x-y plane. As the beam of ions 31 enters the ion guide or ion mobility separator 30, the ions are allowed to assume equilibrium positions within the ion guide or ion mobility separator 30 by a process of diffusion. As a result, ions are free to spread out in the positive and negative x-directions (relative to a central longitudinal axis) so that the ions assume an extended rectangular spatial profile in the x-y plane as illustrated by FIG. 3.

It will be understood that the particular embodiment shown and described above in relation to FIG. 3 represents a passive embodiment wherein ions are allowed to diffuse in the x-direction. However, other alternative active embodiments are contemplated wherein ions may be deflected actively in the x-direction. For example, according to various embodiments ions entering the ion guide or ion mobility separator 30 may be distributed or otherwise dispersed within the entrance of the ion guide or ion mobility separator 30 in an active manner using one or more deflection electrodes. Ions may be distributed homogeneously in the x-direction.

Embodiments are also contemplated wherein ions may be dispersed in the x-direction by a combination of passive diffusion as well as by active deflection using one or more deflection electrodes. According to various embodiments by the time that ions exit the ion guide or ion mobility separator 30 the ions may be arranged to have assumed equilibrium positions in the x-y plane.

The stratification effects described above in respect of the known ion guide as shown in FIG. 2 may still occur to a limited extent in the y-dimension of the ion guide or ion mobility separator 30 according to various embodiments due to the fact that ions are confined in the y-dimension by a pseudo-potential well. However, stratification effects in the x-dimension are significantly reduced and to the extent that the ions are stratified or otherwise distributed in a mass to charge ratio and/or charge state dependent manner in the x-dimension, such stratification of ions is limited to the two end or lateral regions in the x-dimension closest to the two second longitudinal plate or planar electrodes 37 arranged in the y-z plane. Importantly, ions distributed around the central region of the ion guide will not be subjected to stratification effects in the x-direction and will be distributed homogeneously.

As will be described in more detail below, with reference to FIGS. 4A and 4B, the lack of stratification of ions (or the homogeneity of ions) in the central region of the ion guide or ion mobility separator in the x-direction may be exploited according to various embodiments in order to enable an ion beam attenuator to be provided wherein an ion beam which is onwardly transmitted by the ion beam attenuator (operating in an ion beam attenuation mode) does not suffer from substantial stratification effects.

In particular, as will be described in more detail below with reference to FIGS. 4A and 4B, the ion beam attenuator may be arranged to attenuate the lateral portions of an ion beam having, for example, a rectangular cross-sectional profile. Stratification effects may be evident to a minor extent in the lateral portions of an ion beam having a rectangular profile according to various embodiments. However, ions in such lateral portions may be ejected from the ion guide (or deflected off-axis) and hence lost to the system. As a result, the ion beam 31 is attenuated or otherwise reduced in intensity as the ion beam 31 is onwardly transmitted by the ion guide or ion mobility device 30.

Accordingly, a particularly beneficial aspect of the various embodiments is that there will be substantially no stratification of ions (or at worst minimal or significantly reduced stratification of ions) in the x-dimension for ions at equilibrium taking positions towards the centre of the ion guide or ion mobility separator 30 in the x-direction.

As a result, the composition of a population of ions exiting the ion guide or ion mobility separator 30 at a central position in the x-direction of the ion guide or ion mobility separator 30 as shown in FIG. 3 will substantially represent the composition of the population of ions entering the device i.e. there is substantially zero or only minimal undesired stratification of ions in the x-direction in the central portion of the ion guide or ion mobility separator 30 and it is this population of homogeneously distributed ions which is onwardly transmitted.

Furthermore, the distribution of ions will remain representative of the initial population of ions unless or until severe space charge saturation effects begin to dominate.

According to various embodiments the population of ions travelling through or exiting the ion guide or ion mobility separator 30 may be controllably attenuated by restricting the onward passage of ions so as to allow only ions having spatial positions within a defined region or portion of the x-y plane to exit the device 30. According to an embodiment ions distributed in a region in the x-y plane centred around the centre of the ion guide or ion mobility separator 30 in the x-dimension may be allowed to travel onwards to a downstream device.

All other ions which are not onwardly transmitted or otherwise directed to the downstream region of the ion guide or ion mobility separator 30 may be deflected orthogonally by deflection or attenuation electrodes such that ions at either lateral extremes of the ion guiding region in the x-direction may be caused to leave or otherwise be ejected from the ion confining electrode structure. As will also be described in more detail below with reference to FIGS. 4A and 4B, ions which are ejected from the ion guide or ion mobility separator 30 may be arranged to be ejected through a section or portion of the ion guide or ion mobility separator 30 in which ions are not subjected to RF radial confinement (or where ions are subjected to relative weak RF radial confinement). As a result, ions which are ejected from the ion guide or ion mobility separator 30 may either pass through a region of non-RF confinement or may pass through a region of relatively weak RF confinement such that the ions escape the ion guide or ion mobility separator 30 and are essentially lost to the system. Other embodiments are contemplated wherein ions are deflected off-axis.

According to various embodiments ions which are orthogonally deflected or otherwise ejected from the ion guide or ion mobility separator 30 may be deflected or otherwise ejected from the ion guide or ion mobility separator 30 in a manner such that the ions avoid striking or otherwise impinging upon the first upper electrode plate or planar electrodes 36a, the first lower plate or planar electrodes 36b and the second longitudinal plate or planar electrodes 37. It will be understood that it is particularly beneficial to ensure that ions which are deflected or otherwise ejected from the ion guide or ion mobility separator 30 (or which are deflected off-axis) do not strike the electrode plates or planar electrodes 36a, 36b, 37 in order to minimise undesired potential surface contamination and/or surface charging effects.

A portion of the ion population may be stopped, ejected or deflected from the ion guiding region or ion mobility separation device using a set of deflection or extraction electrodes disposed at the exit end of the ion guiding region or at one or more other locations within, along or downstream of the ion guide or ion mobility separator 30 according to various embodiments. Such embodiments allow for the attenuation of the ion population to be varied depending upon the requirement or limitation of any downstream device. This will be illustrated in more detail with reference to FIGS. 4A and 4B.

Figure 4A:
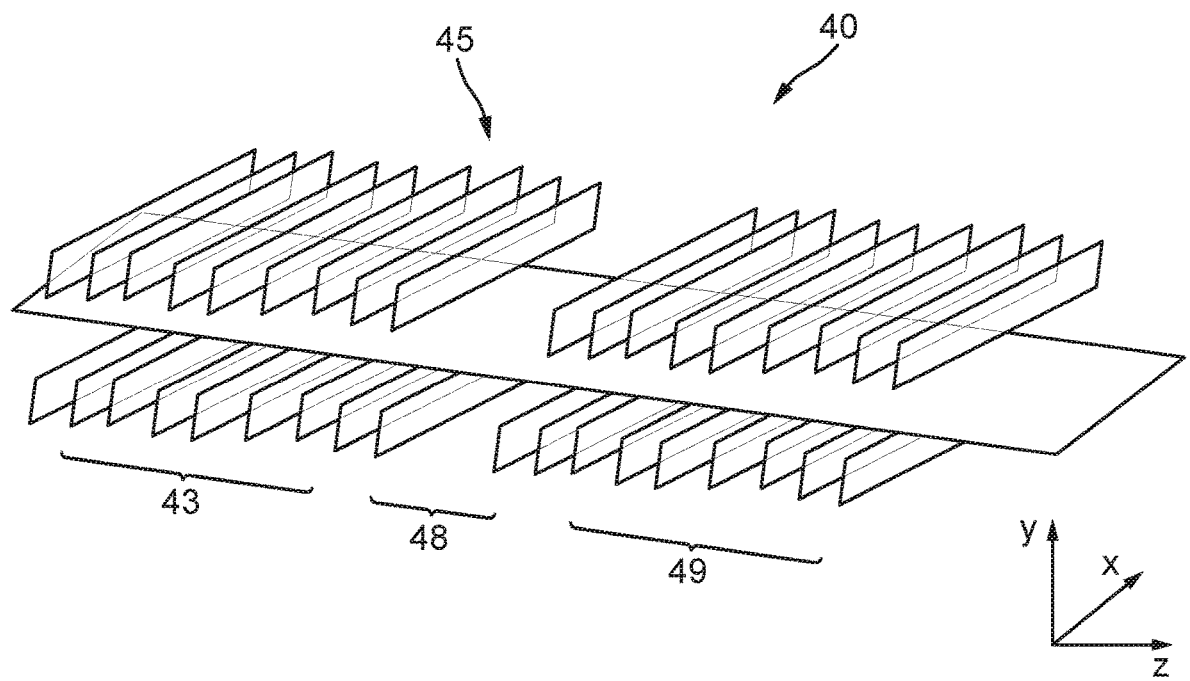
FIG. 4A shows an ion guide according to embodiment wherein the ion guide is operated in a high transmission mode of operation such that ions pass substantially unimpeded through the ion guide and FIG. 4B shows the ion guide being operated in another mode of operation wherein the lateral portions of an ion beam passing through the ion guide are deflected upwards and out of the ion guide so that a portion of ions are effectively lost to the system with the result that an ion beam passing through the ion guide is attenuated by an attenuation factor.
Figure 4B:
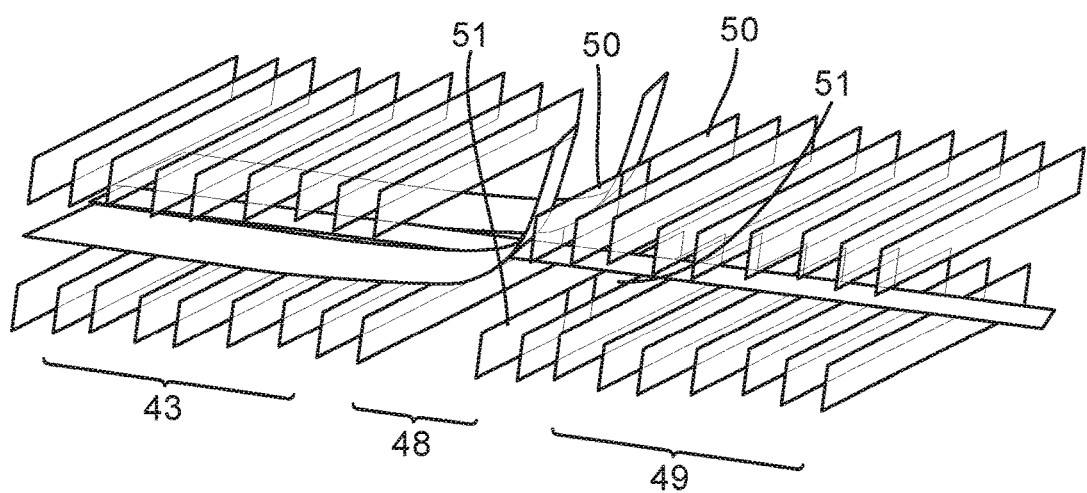

FIGS. 4A and 4B show in more detail an ion guide or ion mobility separator 40 according to various embodiments wherein the ion guide or ion mobility separator 40 comprises a first upstream region or section 43 and a second downstream region or section 49. A third intermediate region or section 48 may be provided between the first upstream region or section 43 and the second downstream region or section 49. The third intermediate region or section 48 may comprise a region wherein there is substantially no RF confinement of ions or wherein ions are subjected to only relatively weak RF confinement within the ion guide or ion mobility separator 40 such that ions actively ejected (or deflected) from the ion guide or ion mobility separator 40 are able to exit the intermediate region or section 43. Other embodiments are contemplated wherein the ions are deflected off-axis.

The ion guide or ion mobility separator 40 may be operated in a first high transmission mode of operation as illustrated by FIG. 4A wherein ions may be arranged to pass substantially unimpeded through the entire electrode structure so that the ions emerge as shown in FIG. 4A from the ion guide or ion mobility separator 40 without being attenuated.

The ion guide may also be operated in another second lower transmission mode of operation as illustrated by FIG. 4B wherein a DC voltage may be applied to one, two or more than two attenuation or deflection plate or planar electrodes 50, 51. The two attenuation or deflection plate or planar electrodes 50, 51 shown in FIG. 4B may be located downstream of the intermediate region or section 48 and may be positioned effectively at the entrance to the second downstream region or section 49. It will be apparent from FIGS. 4A and 4B that the attenuation or deflection plate or planar electrodes 50, 51 may comprise an electrode arrangement which is segmented in the x-direction so that different electrode sections of the electrode arrangement in the x-direction may be maintained at different DC potentials.

According to various embodiments one or more DC voltages may be applied to the two attenuation or deflection plate or planar electrodes 50, 51 such that some of the ions in the ion beam are deflected orthogonally upwards or in a radial direction (i.e. y-direction) which is generally orthogonal to the direction of ion travel through the ion guide or ion mobility separator 40 (i.e. z-direction). Ions in the central region or portion of the ion beam (which may be distributed homogeneously) are allowed to travel onwards into and through the second downstream ion guide section 49. Ions which are deflected in the intermediate region or section 48 wherein there is substantially no RF confinement of ions may be deflected or otherwise ejected from the ion guide or ion mobility separator 40 such that the ions pass through the intermediate region or section 48 of the ion guide or ion mobility separator 40 wherein there is substantially no RF confinement of ions. As a result, the ions may be ejected or deflected from the ion guide or ion mobility separator 40 without impacting or impinging upon any plate electrodes. Other embodiments are contemplated wherein the ions are deflected off the optical axis i.e. wherein the ions are deflected off or away from the z-direction. The ejected or deflected ions are hence lost to the system.

The two plate or planar attenuation electrodes 50, 51 arranged downstream of the intermediate region or section 48 and at the entrance to the second downstream region or section 49 may comprise one or more upper planar or plate electrodes 50 and/or one or more lower planar or plate electrodes 51. For example, the one or more upper planar or plate electrodes 50 and/or the one or more lower planar or plate electrodes 51 may be segmented so as to form two, three, four, five, six, seven, eight, nine, ten or more than ten discrete electrodes which extend e.g. in the x-direction.

According to various embodiments, and as illustrated by FIGS. 4A and 4B, the onward transmission of ions may be varied between just two attenuation values. However, according to other embodiments by segmenting the attenuation or deflection electrodes 50, 51 into multiple discrete sections it is possible for a finer control of the ion beam attenuation to be achieved. In particular, an attenuation device may be provided which is capable of attenuating an ion beam between one of several different attenuation values as desired. For example, embodiments are contemplated wherein two, three, four, five, six, seven, eight, nine, ten or more than ten different attenuation values or settings may be achieved during various modes of operation.

The cross-sectional area over which the population of ions is spread may be extended in a direction (e.g. x-direction) which is orthogonal to the direction of ion travel (e.g. z-direction) and the attenuation may be achieved by restricting axial travel of ions in such a way that only ions within a portion of the cross-sectional area of the ion guiding region are allowed to travel onwards to a downstream device.

According to various embodiments ions may be attenuated within the ion guide or ion mobility separator 40 at elevated pressures in the presence of a buffer gas (e.g. air, nitrogen, helium, argon, carbon dioxide etc.) such that ions are at substantially thermal energies. For example, the buffer gas (e.g. air, nitrogen, helium, argon, carbon dioxide etc.)

may be maintained at a pressure of 0.5-10 mbar. However, according to other embodiments the ion guide 40 may be maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

In the particular embodiment shown in FIGS. 4A and 4B, the upstream section 43 of the ion guide or ion mobility separation device 40 may comprise a separation region of an ion mobility separation device and the downstream section 49 of the ion guide or ion mobility separation device 40 may comprise a transfer region. The ion beam cross sectional profile may be reduced by one or more lens elements or by the geometry of an ion guide downstream of transfer region 49 in order to produce a beam profile suitable for interfacing with other downstream devices. For example, according to various embodiments the cross-sectional profile of an ion beam being transmitted through the transfer region 49 may be progressively restricted or enlarged. Embodiments are also contemplated wherein the cross-sectional profile of an ion beam may be progressively shaped as ions pass through the transfer region 49. For example, according to an embodiment the cross-sectional profile of an ion beam passing through the transfer region 49 may be progressively changed from having a rectangular cross-sectional profile to having a square or near circular cross-sectional profile so as to facilitate transmitting ions through a circular differential pumping aperture or into a downstream ion optical device having a circular acceptance angle. Other embodiments are contemplated wherein the ion beam profile may be progressively changed from a first rectangular or square cross-sectional profile to a second different rectangular or square cross-sectional profile.

Figure 5:
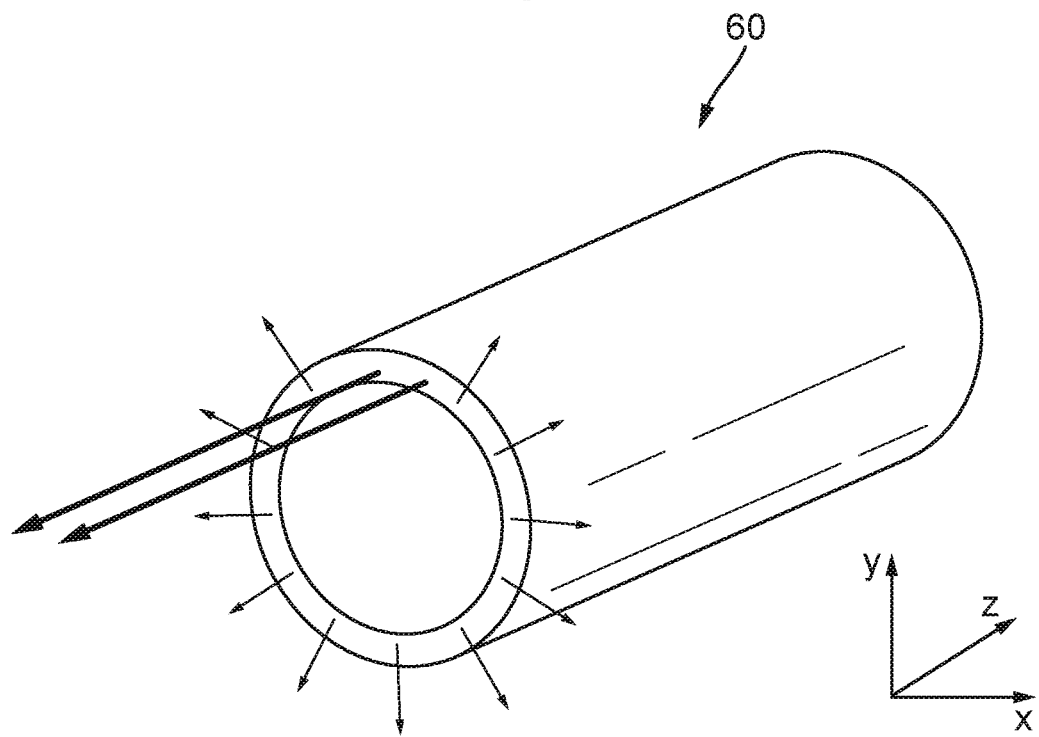
FIG. 5 shows a further embodiment comprising an annular ion guide.

FIG. 5 shows an ion guide or ion mobility separator 60 according to another embodiment which is similar in principle to the various embodiments shown and described above in relation to FIGS. 3, 4A and 4B except that ions are confined within an ion guiding region having an annular cross-sectional profile.

In an analogous manner to the embodiments shown and described above with reference to FIGS. 3, 4A and 4B, and as illustrated by FIG. 5, only ions from a certain physical portion, annular position, region, sector or segment of the annular cross section may be allowed to exit the device 60 or otherwise be onwardly transmitted by the ion guide or ion mobility separator 60. All other ions may be ejected radially from the ion guide or ion mobility separator 60 in a region of the ion guide or ion mobility separator 60 wherein ions are not subjected to RF confinement in a radial direction.

The particular embodiment shown and described above with reference to FIG. 5 has the particular advantage that once ions have reached equilibrium the composition of the ion population is the same for all points around the annular cross section.

There are several known methods in which control of ion transmission may be used to extend the dynamic range of an orthogonal acceleration Time of Flight mass spectrometer.

For example, U.S. Pat. No. 7,038,197 (Micromass) describes a method in which a primary ion beam is repeatedly switched between a high transmission mode and a low transmission mode. Individual mass spectral peaks in high transmission data which exceed the dynamic range of the detection system may be replaced by corresponding data from the low transmission data (suitably scaled). This method produces a composite spectrum with increased dynamic range. GB-2518491 (Micromass) describes a method of determining and flagging the saturation of ion arrivals at a detector of a Time of Flight mass spectrometer. Rags may be used to guide software to merge or combine data from two or more predetermined transmission values into a single, high dynamic range spectrum. In this way high dynamic range data for nested LC-IMS-MS acquisitions may be produced.

It is contemplated that similar methods of transmission control may be used in a data dependent or feedback control manner in order to control the intensity of target analytes or populations of ions so as to avoid saturation of an ion detector or a downstream analyser or separator. According to such embodiments multiple attenuation values may be utilised and the attenuation value may be programmed or otherwise be set based on interrogation of previously acquired data.

One important aspect of the various disclosed embodiments is that control of the proportion of ions leaving an ion guide or ion mobility separation device according to various embodiments may be altered or otherwise varied during the ion mobility separation cycle time. Each ion mobility separation cycle may, for example, take <5 ms, 5-10 ms, 10-15 ms, 15-20 ms, 20-25 ms, 25-30 ms or >30 ms. This allows populations of ions having particular ion mobilities to be attenuated by particular values or attenuation factors whilst populations of ions having different ion mobilities which effectively emerge or elute from the ion mobility separator at different drift or elution times may be substantially unattenuated.

Such embodiments enable the overall duty cycle of the mass spectrometer to be maximised, thereby maximising sensitivity for low abundance analytes whilst controlling the intensity of high abundance analytes.

This method may also be used to control space charge distortion at the end of a high capacity ion mobility separation device where the extended ion population needs to be compressed into a smaller cross section prior to entering a downstream analyser such as a quadrupole or a Time of Flight mass analyser.

Although the method of transmission control described does not depend on the charge state, mass to charge ratio or ion mobility of the ions it may not be fully deterministic either and hence may require a degree of calibration for subsequent rescaling. However, any such calibration process (if required) is substantially simplified.

Various embodiments also include a method of calibrating the attenuation factor using the methods described above wherein the method comprises acquiring data from a known standard material at two or more attenuation values and recording the intensity ratio at these two or more values.

The relationship between the potential applied to the deflection or barrier electrodes and the resultant attenuation factor may be determined and used for subsequent intensity scaling of the attenuated ion beam.

In one embodiment the beam profile may already be extended in one dimension prior to the ion beam entering the ion guide or an ion trapping region of an ion mobility separation device. In this case the methods described above may be used to attenuate the signal or ion beam entering an upstream ion guide or trapping region.

Attenuation of the beam prior to ion accumulation in a trapping region has the disadvantage that ions of all mobility must be attenuated by the same amount.

Accordingly, various embodiments have been described above which relate to an ion guide, ion trap or ion mobility separation device wherein ions are allowed to assume a spatial profile which may be extended in at least one direction or wherein the ions are allowed to assume an annular spatial profile. One or more portions of the rectangular or annular ion beam may be ejected or deflected from the ion guide, ion trap or ion mobility separation device (or deflected off-axis) in a controlled manner allowing the ion beam to be attenuated by a desired amount. Furthermore, the ion beam which is onwardly transmitted does not suffer from stratification effects (and is substantially homogeneously distributed in the x-direction and/or y-direction) enabling a much simpler attenuation calibration routine to be performed (if indeed actually required). Furthermore, the ion guide, ion trap or ion mobility separation device according to various embodiments may have an enhanced capacity compared with conventional ion tunnel arrangements. It will be appreciated, therefore, that the various ion guide, ion trap or ion mobility separation devices according to various embodiments represent a significant advance in the art.

Although the present invention has been described with reference to various embodiments, it will be understood by those skilled in the art that various changes in form and detail may be made without departing from the scope of the invention as set forth in the accompanying claims.

The invention claimed is:

1. An ion guide comprising:
an ion separation region arranged and adapted to separate ions and transmit separated ions with a first cross-sectional profile with a first cross-sectional area $A_1$ in a plane orthogonal to a direction of ion transmission; and
an attenuation device arranged downstream of the ion separation region, wherein the attenuation device is arranged and adapted to attenuate separated ions transmitted by the ion separation region with the first cross-sectional profile by ejecting or deflecting separated ions transmitted by the ion separation region with spatial positions which fall outside of a second cross-sectional profile having a second cross-sectional area $A_2$, wherein $A_2 < A_1$.

2. An ion guide as claimed in claim 1, wherein said ion separation region is arranged and adapted such that said separated ions transmitted by said ion separation region are distributed substantially homogenously within said second cross-sectional profile at least in a direction which is substantially orthogonal to said direction of ion transmission.

3. An ion guide as claimed in claim 1, wherein said attenuation device is arranged and adapted to onwardly transmit separated ions transmitted by said ion separation region with spatial positions which fall inside said second cross-sectional profile.

4. An ion guide as claimed in claim 1, wherein said ion guide comprises a plurality of first electrodes and wherein said ion guide further comprises a device arranged and adapted to apply AC or RF voltages to said plurality of first electrodes so as to generate a pseudo-potential well which acts to confine ions in a first radial direction within said ion guide.

5. An ion guide as claimed in claim 1, wherein said ion guide further comprises one or more second electrodes and wherein said ion guide further comprises a device arranged and adapted to apply one or more DC voltages to said one or more second electrodes in order to confine ions in a second radial direction within said ion guide.

6. An ion guide as claimed in claim 1, further comprising a control device arranged and adapted to apply one or more voltages to said attenuation device in order to cause a portion of separated ions transmitted by said ion separation region to emerge from said ion separation region and then either be ejected and/or be deflected off an ion-optical axis.

7. An ion guide as claimed in claim 1, wherein said ion guide comprises a reduced radial confinement section wherein in a mode of operation ions passing through said reduced radial confinement section experience substantially no or a reduced degree of radial confinement, and wherein said attenuation device is located within or adjacent said reduced radial confinement section so that when said attenuation device is activated in order to eject or deflect ions transmitted by said ion separation region, said ions may be substantially ejected or deflected from said ion guide.

8. An ion guide as claimed in claim 6, wherein said attenuation device comprises a plurality of attenuation electrodes and wherein said control device is arranged and adapted to apply one or more voltages to different attenuation electrodes as desired in order to vary, control, increase or decrease an ion attenuation factor.

9. An ion guide as claimed in claim 8, wherein said control device is arranged and adapted to vary, control, increase or decrease said ion attenuation factor as a function of time, retention time, elution time or emergence time, in a time dependent manner or in a predetermined or data dependent manner.

10. An ion guide as claimed in claim 8, wherein said ion separation region is an ion mobility separator, and wherein said control device is arranged and adapted to vary, control, increase or decrease said ion attenuation factor during the course of one or more ion mobility separation cycles of said ion mobility separator.

11. An ion guide as claimed in claim 1, wherein said separation region is arranged and adapted to cause ions to separate according to their ion mobility, differential ion mobility, collision cross section ("CCS") or interaction cross section.

12. A mass spectrometer comprising an ion guide as claimed in claim 1.

13. A method of guiding ions comprising:
separating ions within an ion separation region;
transmitting separated ions from the ion separation region with a first cross-sectional profile with a first cross-sectional area $A_1$ in a plane orthogonal to a direction of ion transmission; and
attenuating the separated ions transmitted by the ion separation region with the first cross-sectional profile downstream of the ion separation region by ejecting or deflecting separated ions transmitted by from the ion separation region with spatial positions which fall outside of a second cross-sectional profile having a second cross-sectional area $A_2$, wherein $A_2 < A_1$.

14. A method as claimed in claim 13, wherein said separated ions transmitted by said ion separation region are distributed substantially homogenously within said second cross-sectional profile at least in a direction which is substantially orthogonal to said direction of ion transmission.

15. A method of mass spectrometry comprising a method as claimed in claim 13.

16. An ion guide as claimed in claim 1, wherein said ion separation region is arranged and adapted to separate ions along said direction of ion transmission, and wherein said second cross-sectional area $A_2$ is in a plane orthogonal to said direction of ion transmission.

17. An ion guide as claimed in claim 1, wherein said second cross-sectional profile corresponds to a central region of said first cross-sectional profile.

* * * * *